United States Patent
Benisty et al.

(10) Patent No.: US 12,493,421 B2
(45) Date of Patent: Dec. 9, 2025

(54) SYSTEM AND METHOD FOR FLEXIBLE EMERGENCY POWER FAIL MANAGEMENT FOR MULTIPLE PERSISTENT MEMORY REGIONS

(71) Applicant: Western Digital Technologies, Inc., San Jose, CA (US)

(72) Inventors: Shay Benisty, Beer Sheva (IL); Ariel Navon, Revava (IL); Alexander Bazarsky, Holon (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 193 days.

(21) Appl. No.: 18/224,835

(22) Filed: Jul. 21, 2023

(65) Prior Publication Data
US 2024/0329860 A1    Oct. 3, 2024

Related U.S. Application Data

(60) Provisional application No. 63/455,413, filed on Mar. 29, 2023.

(51) Int. Cl.
*G06F 3/06* (2006.01)

(52) U.S. Cl.
CPC .......... *G06F 3/0625* (2013.01); *G06F 3/0619* (2013.01); *G06F 3/0626* (2013.01); *G06F 3/0659* (2013.01); *G06F 3/0679* (2013.01)

(58) Field of Classification Search
CPC .... G06F 3/0625; G06F 3/0619; G06F 3/0626; G06F 3/0659; G06F 3/0679
USPC .................................................. 365/149, 226
See application file for complete search history.

(56) References Cited

U.S. PATENT DOCUMENTS

| | | | |
|---|---|---|---|
| 4,816,698 A * | 3/1989 | Hook | H05B 39/085 |
| | | | 323/904 |
| 5,799,200 A | 8/1998 | Brant et al. | |
| 6,707,718 B1 * | 3/2004 | Halim | G11C 29/44 |
| | | | 365/185.33 |
| 10,168,922 B1 * | 1/2019 | Cordero | G06F 11/1441 |

(Continued)

FOREIGN PATENT DOCUMENTS

| | | |
|---|---|---|
| JP | 2022-045317 A | 3/2022 |
| KR | 10-2022-0023087 A | 3/2022 |

OTHER PUBLICATIONS

Intel® Optane™ Persistant Memory Start Up Guide, Revision 2.0; Intel; Oct. 2020; 26 pages.

(Continued)

*Primary Examiner* — Michael T Tran
(74) *Attorney, Agent, or Firm* — Crowell & Moring LLP

(57) ABSTRACT

A system and method are disclosed for flexible emergency power fail management for multiple persistent memory regions. In one embodiment, a method is provided that is performed in a host in communication with a plurality of data storage devices, each data storage device having a persistent memory region, wherein the host comprises a capacitor shared by the plurality of data storage devices. The method comprises determining an allocation of power from the capacitor to each of the plurality of data storage devices; and dynamically changing the allocation of power from the capacitor to at least one data storage device of the plurality of data storage devices. Other embodiments are disclosed.

19 Claims, 9 Drawing Sheets

(56) References Cited

U.S. PATENT DOCUMENTS

| | | |
|---|---|---|
| 10,339,047 B2 | 7/2019 | Kirvan et al. |
| 2008/0273384 A1* | 11/2008 | Sarin .................. G11C 11/5642 |
| | | 365/185.23 |
| 2010/0262847 A1* | 10/2010 | Kim ...................... G06F 1/3287 |
| | | 713/320 |
| 2013/0111109 A1* | 5/2013 | Sartore ............... G06F 12/0638 |
| | | 711/E12.008 |
| 2013/0242683 A1* | 9/2013 | Tanuma .............. G11C 11/4097 |
| | | 365/226 |
| 2016/0283336 A1 | 9/2016 | Petersen |
| 2017/0177374 A1* | 6/2017 | Morning-Smith ...... G06F 1/263 |
| 2017/0317754 A1* | 11/2017 | Kangas ................ H04B 10/807 |
| 2018/0136682 A1 | 5/2018 | Koh |
| 2019/0196742 A1* | 6/2019 | Yudanov ............... G06F 3/0604 |
| 2019/0279899 A1* | 9/2019 | Maruthamuthu ........................... |
| | | H01L 21/76832 |
| 2020/0072884 A1* | 3/2020 | Rowley ................ G06F 1/3296 |
| 2020/0210292 A1* | 7/2020 | Kim ................... H03M 13/152 |
| 2020/0258593 A1* | 8/2020 | Badrieh ................ G11C 29/54 |
| 2021/0026837 A1 | 1/2021 | Talagala et al. |
| 2021/0096619 A1* | 4/2021 | Wang ..................... G06F 1/206 |
| 2022/0137694 A1 | 5/2022 | Parry et al. |
| 2022/0139936 A1* | 5/2022 | Ocker .................. G11C 11/221 |
| | | 257/295 |
| 2023/0067249 A1* | 3/2023 | Lee ........................ H10D 1/716 |

OTHER PUBLICATIONS

Geldman, J. et al.; "NVM Express® Technical Proposal for New Feature"; TP4029—Power Loss Signal Support; NVM Exgress, Inc.; Mar. 14, 2022; 27 pages.

NVM Express® Base Specification, Revision 1.4; downloaded from the Internet on Jul. 20, 2023 at nvmexgress.org/wp-content/uploads/NVM-Express-1_4-2019.06.10-Ratified.pdf); Jun. 10, 2019; 403 pages.

Zardoshti, P. et al.; "Optimizing Persistent Memory Transactions"; 2019 28th International Conference on Parallel Architectures and Compilation Techniques (PACT); IEEE Computer Society; Sep. 23, 2019; pp. 219-231.

International Search Report and Written Opinion mailed May 31, 2024 for International Application No. PCT/US2024/012470.

* cited by examiner

SYSTEM AND METHOD FOR FLEXIBLE EMERGENCY POWER FAIL MANAGEMENT FOR MULTIPLE PERSISTENT MEMORY REGIONS

CROSS-REFERENCE TO RELATED APPLICATION

This application claims priority to U.S. provisional patent application No. 63/455,413, filed Mar. 29, 2023, which is hereby incorporated by reference.

BACKGROUND

A persistent memory region (PMR) can be implemented in a volatile memory of a data storage device. A PMR can be allocated to a host, and the host can read or write to the PMR directly using basic read/write commands without the need for using command queues. A PMR is persistent in that it is backed by a capacitor in the data storage device. More specifically, in the event of a power loss, the data stored in the PMR can be automatically written to non-volatile memory in the data storage device. When power is restored, the host can send a request to the data storage device to reload the data from the non-volatile memory to the PMR.

DETAILED DESCRIPTION

Figure 1A:
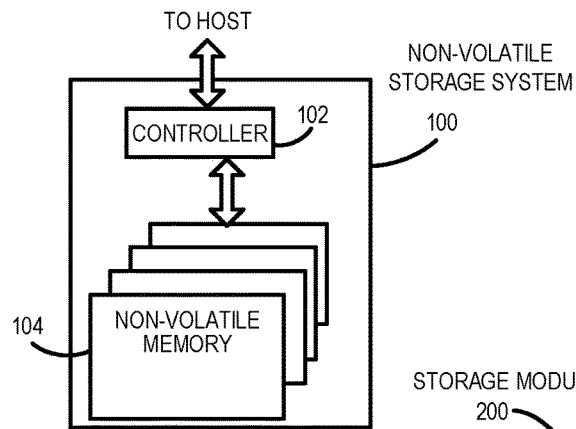
FIG. 1A is a block diagram of a data storage device of an embodiment.

The following embodiments generally relate to a system and method for flexible emergency power fail management for multiple persistent memory regions. In one embodiment, a method is provided that is performed in a host in communication with a plurality of data storage devices, each data storage device having a persistent memory region, wherein the host comprises a capacitor shared by the plurality of data storage devices. The method comprises determining an allocation of power from the capacitor to each of the plurality of data storage devices; and dynamically changing the allocation of power from the capacitor to at least one data storage device of the plurality of data storage devices.

In some embodiments, power allocated to a given data storage device enables that data storage device to copy data from its persistent memory region to its non-volatile memory in an event of a power failure.

In some embodiments, the allocation of power is dynamically changed in response to a requirement from the at least one data storage device.

In some embodiments, the allocation of power is dynamically changed in response to a period of time elapsing.

In some embodiments, the allocation of power is dynamically changed in response to a change of priority among the plurality of data storage devices.

In some embodiments, the allocation of power is dynamically changed in response to a removal a data storage device from the plurality of data storage devices.

In some embodiments, the allocation of power is dynamically changed in response to an addition of another data storage device to the plurality of data storage devices.

In some embodiments, the allocation of power is dynamically changed in response to a change in capacitance of the capacitor.

In some embodiments, the method further comprises changing a transfer buffer size of the at least one data storage device based on the change in the allocation of power to the at least one data storage device.

In some embodiments, the method further comprises changing a size of the persistent memory region of the at least one data storage device based on the change in the allocation of power to the at least one data storage device.

In some embodiments, the host is in communication with the plurality of data storage devices via a switch.

In another embodiment, a data storage device is provided comprising: a non-volatile memory; a volatile memory; and a controller configured to communicate with the non-volatile memory, the volatile memory, and a host. The controller is further configured to receive, from the host, a size allocated for a persistent memory region in the volatile memory that is backed by a host capacitor that is shared by at least one other data storage device; receive, from the host, a rebalanced size for the persistent memory region due to a change in supplied power from the host capacitor; and evacuate, from the persistent memory region to the non-volatile memory, data that can no longer be stored in the persistent memory region due to the rebalanced size.

In some embodiments, the controller is further configured to inform the host after the data has been evacuated from the persistent memory region to the non-volatile memory.

In some embodiments, the controller is further configured to change a transfer buffer size in response to the rebalanced size.

In some embodiments, the controller is further configured to write contents of the persistent memory region to the non-volatile memory in response to an emergency power fail.

In some embodiments, the controller is further configured to return the contents to the persistent memory region in response to a return of power.

In some embodiments, the host is configured to read or write to the persistent memory region directly without using a command queue in the data storage device.

In some embodiments, the controller is further configured to cache, in the persistent memory region, at least a portion of a logical-to-physical address table.

In some embodiments, the non-volatile memory comprises a three-dimensional memory.

In another embodiment, a host is provided comprising: a capacitor shared by a plurality of data storage devices; and means for dynamically changing an allocation of power from the capacitor to at least one data storage device of the plurality of data storage devices.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
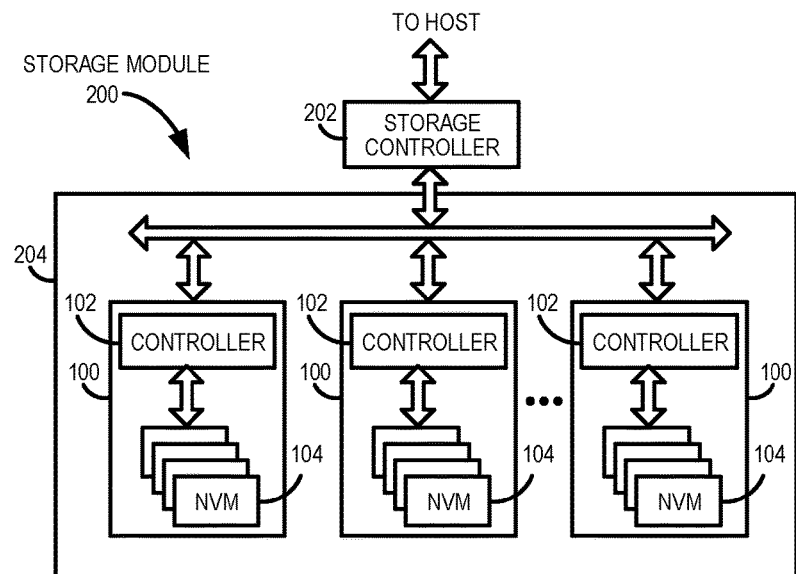
FIG. 1B is a block diagram illustrating a storage module of an embodiment.
Figure 1C:
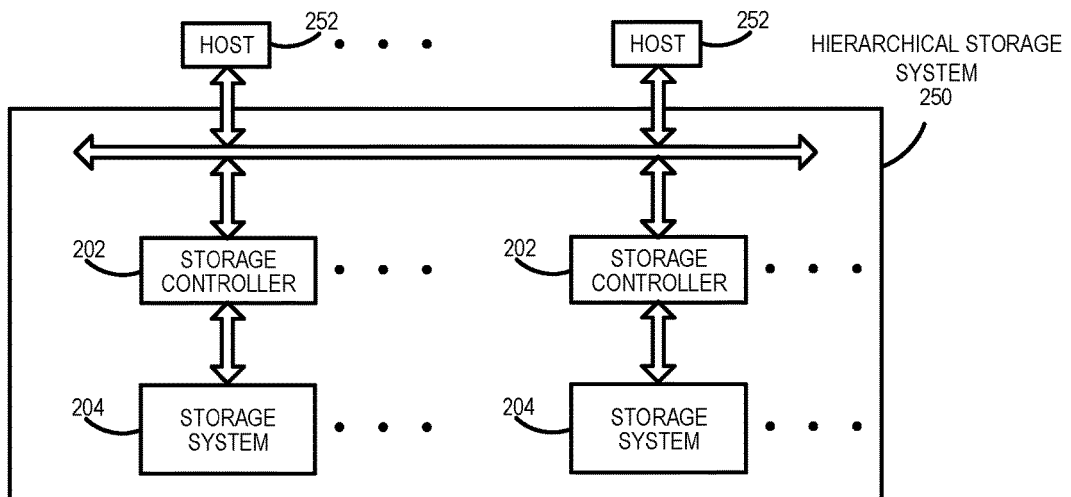
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
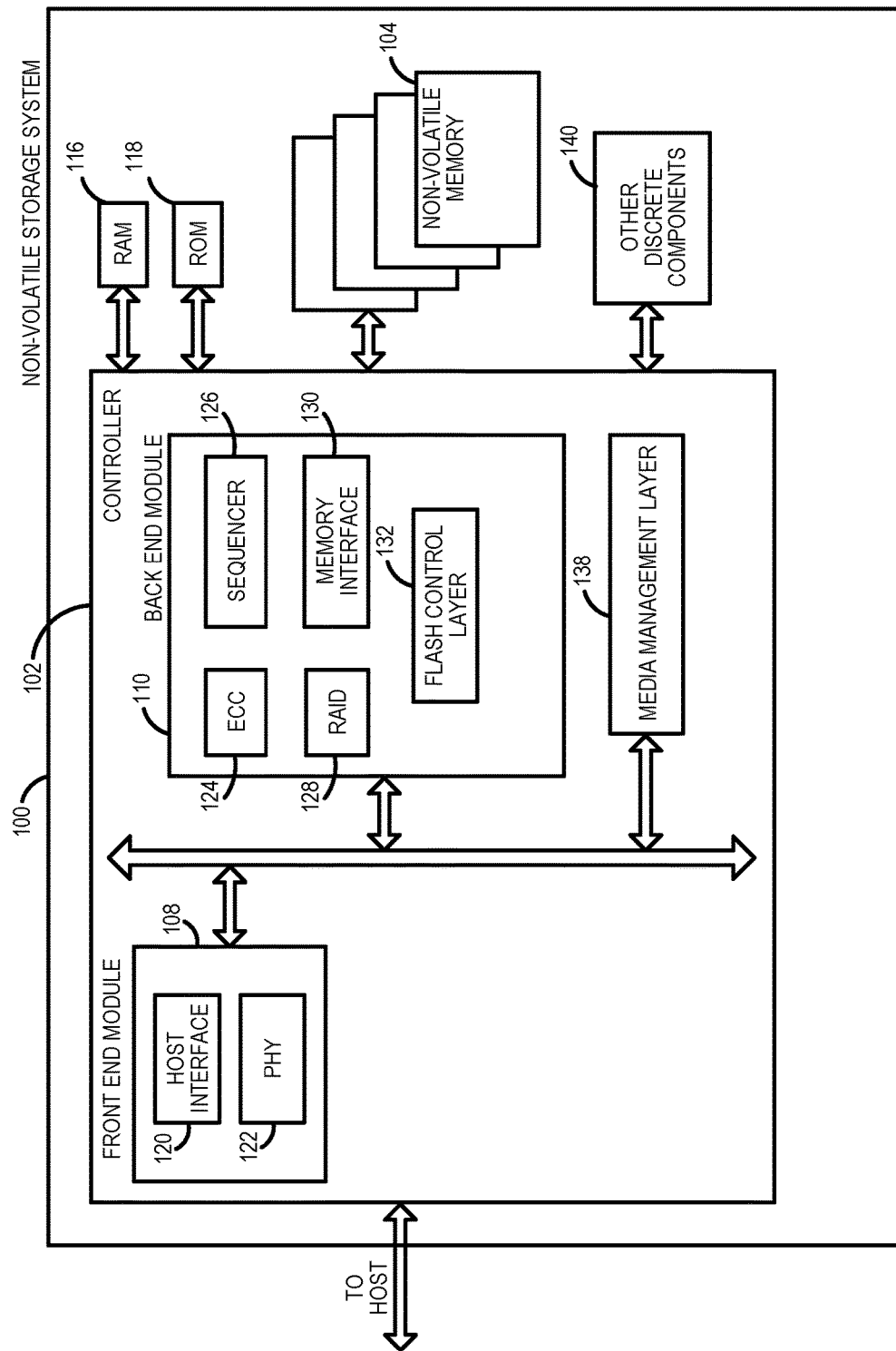
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
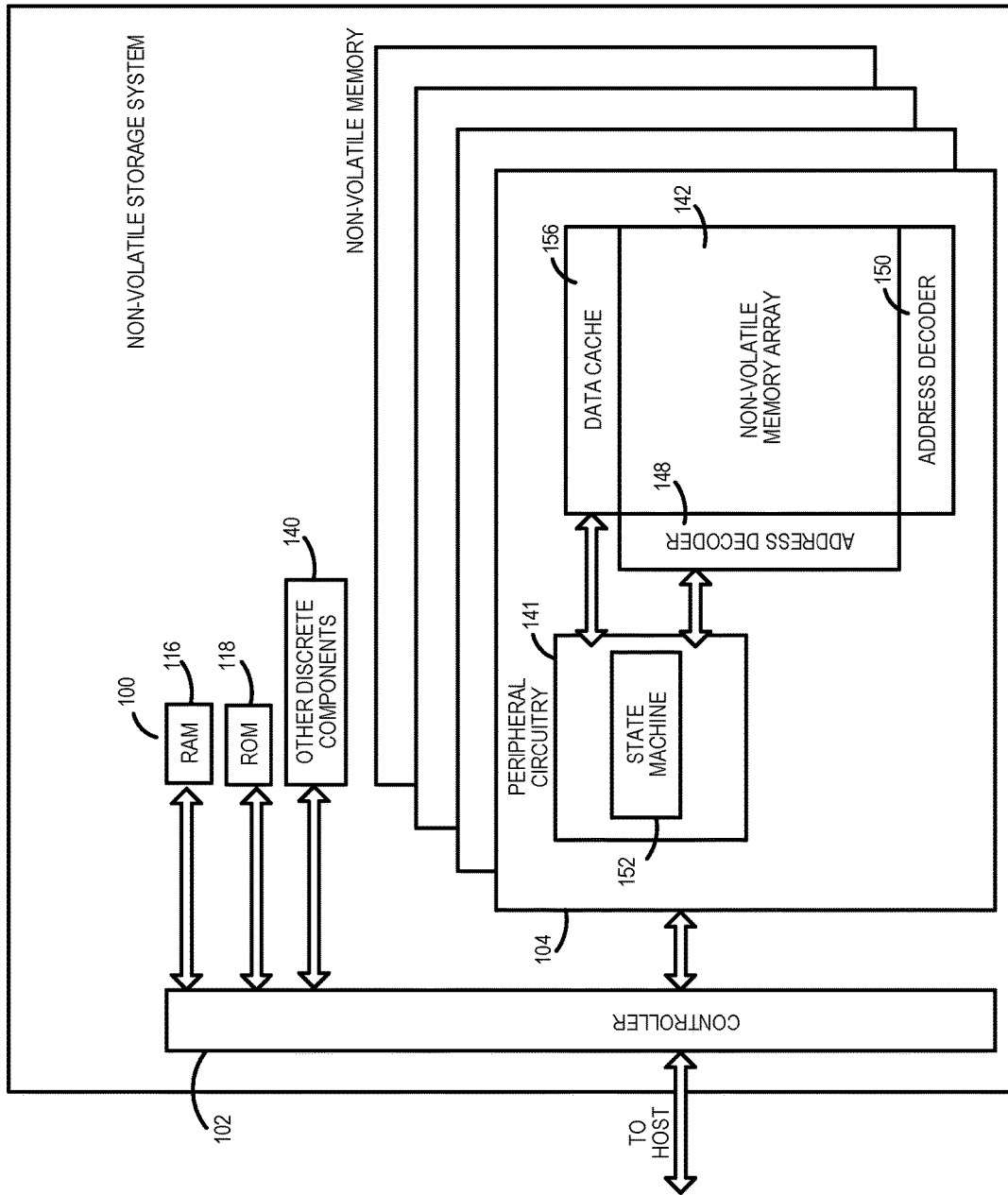
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
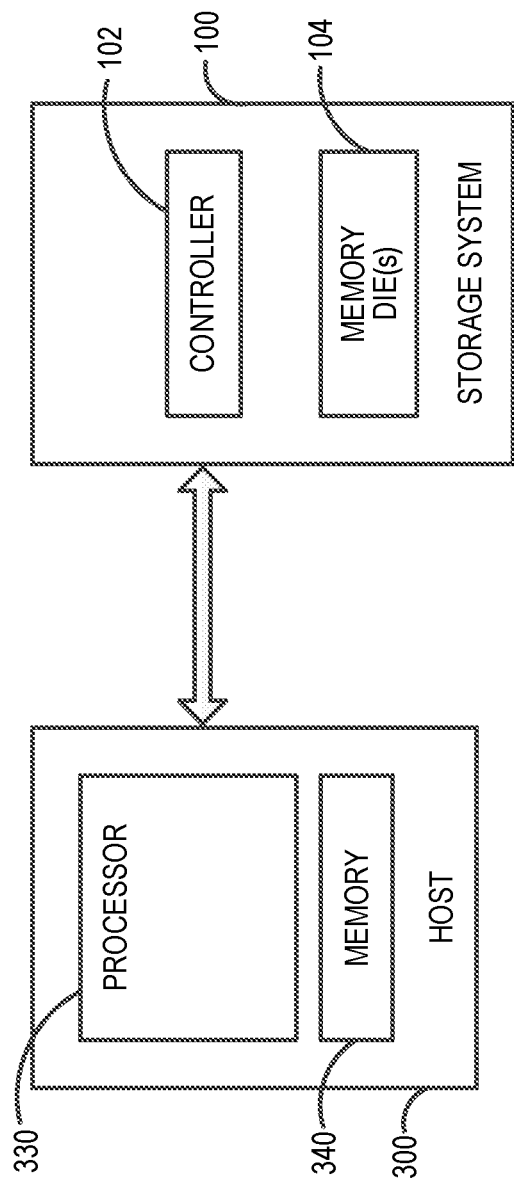
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a persistent memory region (PMR) can be implemented in volatile memory (e.g., dynamic random access memory (DRAM)) in a data storage device. A PMR can be allocated to a host, and the host can read or write to the PMR directly using basic read/write PCIe transfers without using command queues. For example, the host can use the PMR as a cache for the Flash translation layer's tables that track the mapping between logical block addresses and physical memory addresses. A PMR is persistent in that it is backed by a capacitor in the data storage device. In the event of a power loss from the host to the data storage device (e.g., in an emergency power fail (EPF)

situation), the data stored in the PMR can be automatically written to non-volatile memory (e.g., Flash) in the data storage device. When power is restored, the host can send a request to the data storage device to reload the data back to the PMR from the non-volatile memory.

Figure 4:
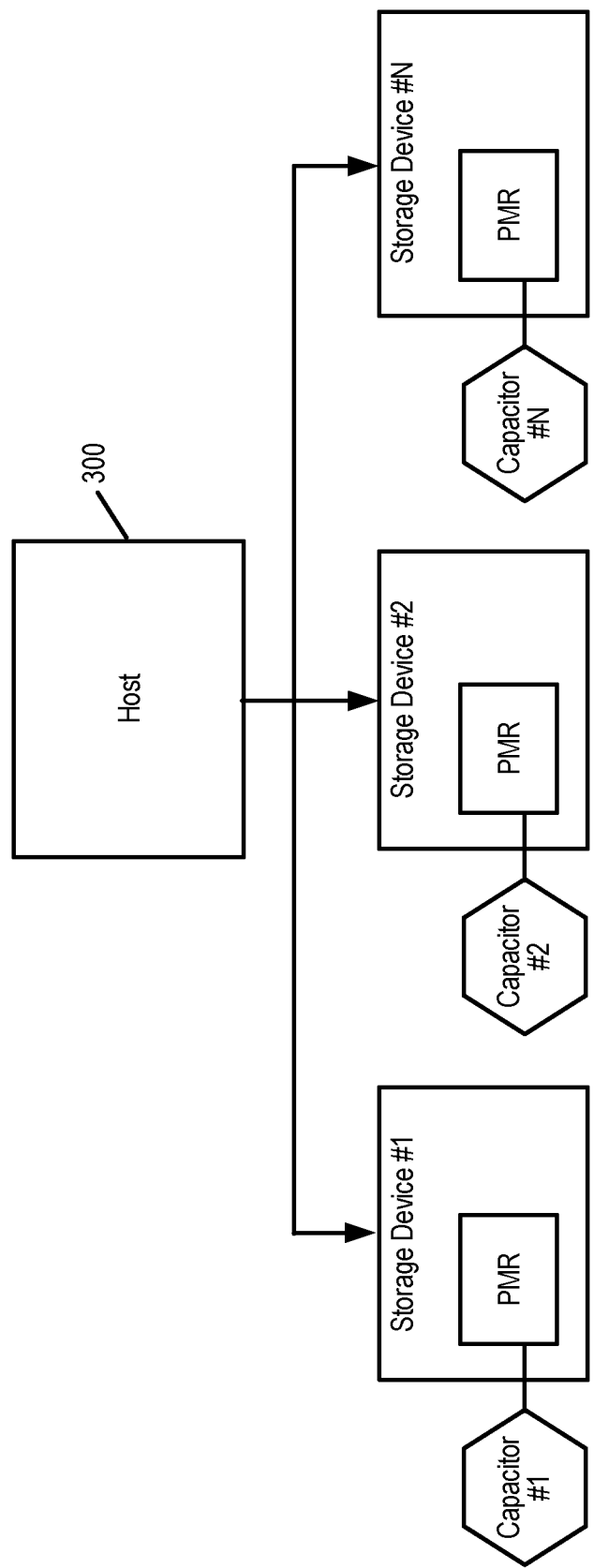
FIG. 4 is a block diagram of a system of an embodiment comprising a plurality of data storage devices, each having its own capacitor.

Turning again to the drawings, FIG. 4 is an illustration of an environment in which a plurality of data storage devices, each with its own PMR partition in volatile memory and its own capacitor, are in communication with the same host 300. Having multiple capacitors in this situation may not be cost effective, and the NVMe specification provides a host-side capacitor power management technique that includes signaling methods in order to allow data storage devices to share a host-side capacitor. However, only static methods for providing capacitor requirements to hosts are described in the NVMe specification, and those are based on power states.

In one embodiment, the signaling mechanism for EPF and the state machine described in the NVMe specification can be used but are improved upon by adding specific extensions and enablement for PMR that are not covered by the standard. (It should be noted while the embodiments are described herein with reference to the NVMe standard, these embodiments can be used in other environments. Accordingly, the use of NVMe should not be read into the claims unless expressly recited therein.) In general, with these embodiments, multiple PMR partitions in multiple data storage devices are managed jointly when one or more host-based capacitors are used to supply enough power to multiple data storage devices in case of an EPF. In other words, one or more shared host capacitors can take the place of individual data storage device capacitors in backing up the PMRs in the data storage devices. (An individual data storage device can still be made with a capacitor for use when the data storage device is not used in a shared environment.) These embodiments can provide the advantage of better utilizing the PMR partitions and pooling available power resources per host rather than per data storage device. There embodiments can also reduce power consumption and improve PMR performance in high-end hosts that involve multiple storage devices.

In one embodiment, the capacitance resources of all (or part of) the data storage devices employed by the host are jointly controlled by the host. These capacitance resources may be used in the process of EPF to provide enough power to the PMR partitions of the data storage devices to safely offload the data to their non-volatile memories. This embodiment will now be discussed in more detail in conjunction with the block diagram shown in FIG. 5.

Figure 5:
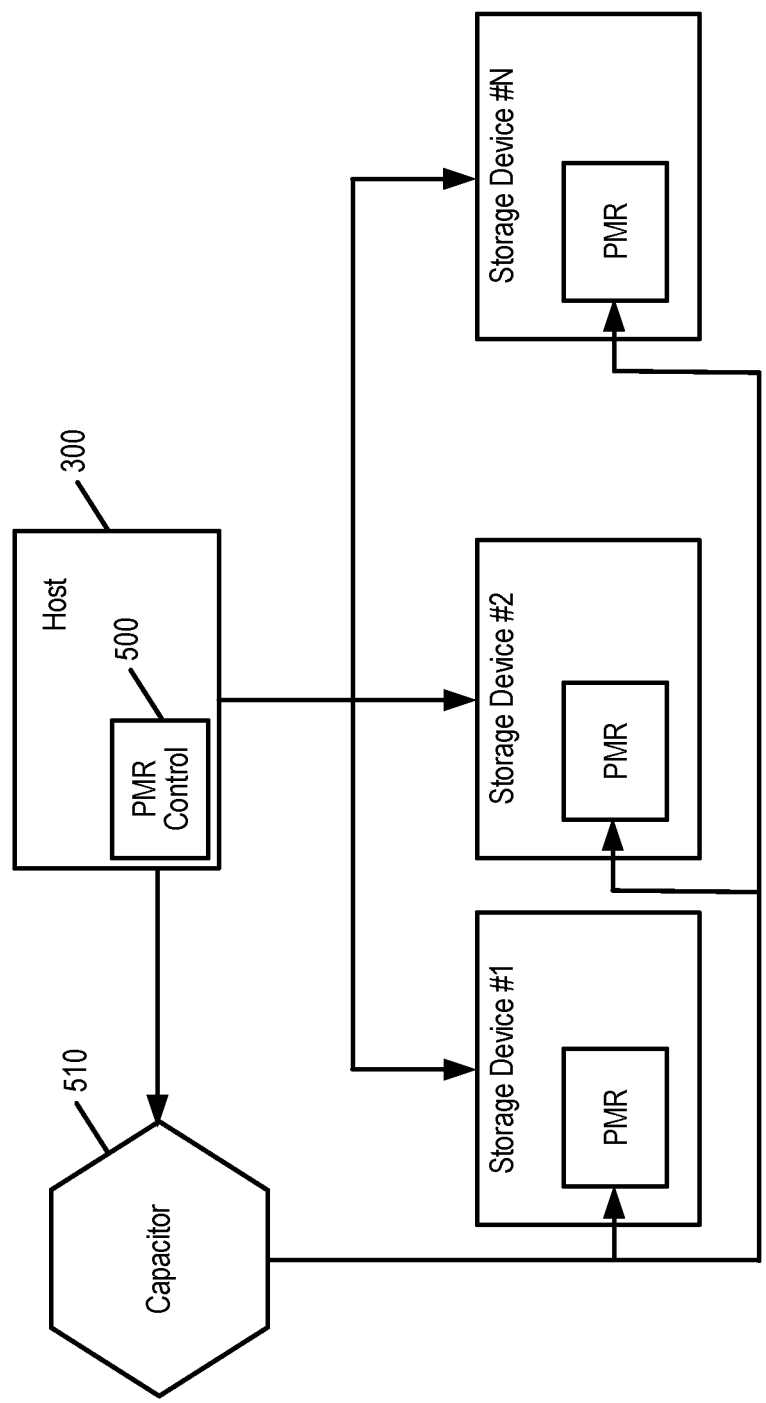
FIG. 5 is a block diagram of a system of an embodiment comprising a plurality of data storage devices sharing a host capacitor.

As shown in FIG. 5, in this embodiment, a plurality of data storage devices, each with its own PMR partition, are in communication with a host 300. The host 300 has a capacitor 510 that is shared by the plurality of data storage devices. The capacitor 510 is diagrammatically shown outside of the host 300 in FIG. 5, but it should be understood that the capacitor 510 can be located inside the host 300. Also, while a single capacitor 510 is shown in FIG. 5, it should be understood that multiple host capacitors can be used.

The host 300 in this embodiment comprises a PMR control module 500 the is configured to log the required power for each PMR partition and provide the power from the shared, joint capacitor 510 in the event of an EPF. As noted above, a module can take any suitable form. In one embodiment, the module comprises a processor that can execute computer-readable program code stored in a memory of the host to perform the functions described herein with respect to the PMR control module 500.

In one embodiment, in order to use the pooled resources efficiently, in case of an EPF, the power provided to each data storage device may change dynamically according to the requirements from each individual data storage device. In another embodiment, the size of the transfer buffer of each data storage device can vary according to the EPF budget provided by the PMR control module 500, so that a given data storage device is also aware of the maximum power budget that it can use. The higher the transfer buffer size, the bigger the capacitor that is needed for EPF. Also, PMR partition size of each of the data storage devices can vary according to the priority determined by the host 300. In order to maintain the system efficiently, a corresponding protocol to dynamically modify the PMR size can be used.

Figure 6:
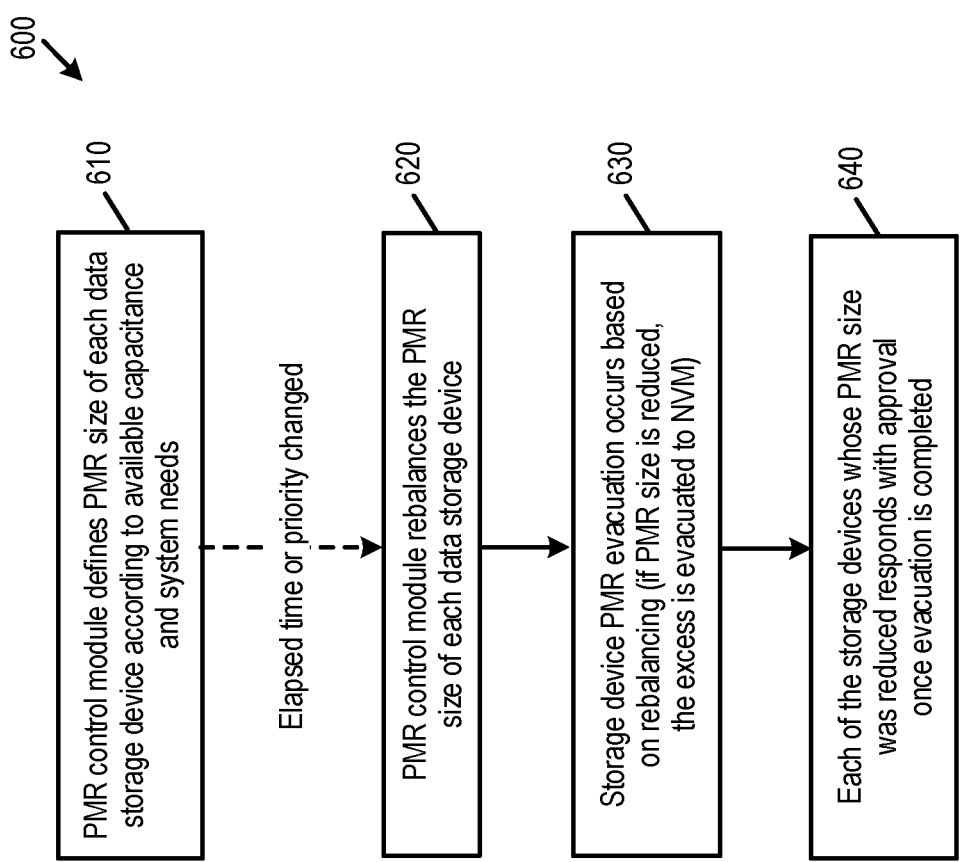
FIG. 6 is a flow chart of a rebalancing method of an embodiment.

FIG. 6 is a flow chart 600 of a method of an embodiment for management of multiple PMR devices by the PMR control module 500. As shown in FIG. 5, the PMR control module 500 defines the PMR size of each data storage device according to available capacitance and system needs (act 610). After a period of time or a priority change, the PMR control module 500 rebalances the PMR size of each data storage device (act 620). Then, data storage device PMR evacuation occurs based on rebalancing (act 630). For example, if PMR size of a given data storage device is reduced, the "excess" data can be evacuated to non-volatile memory in that data storage device. Finally, each of the data storage devices whose PMR size was reduced can respond with approval once the evacuation has been completed (act 540).

Figure 7:
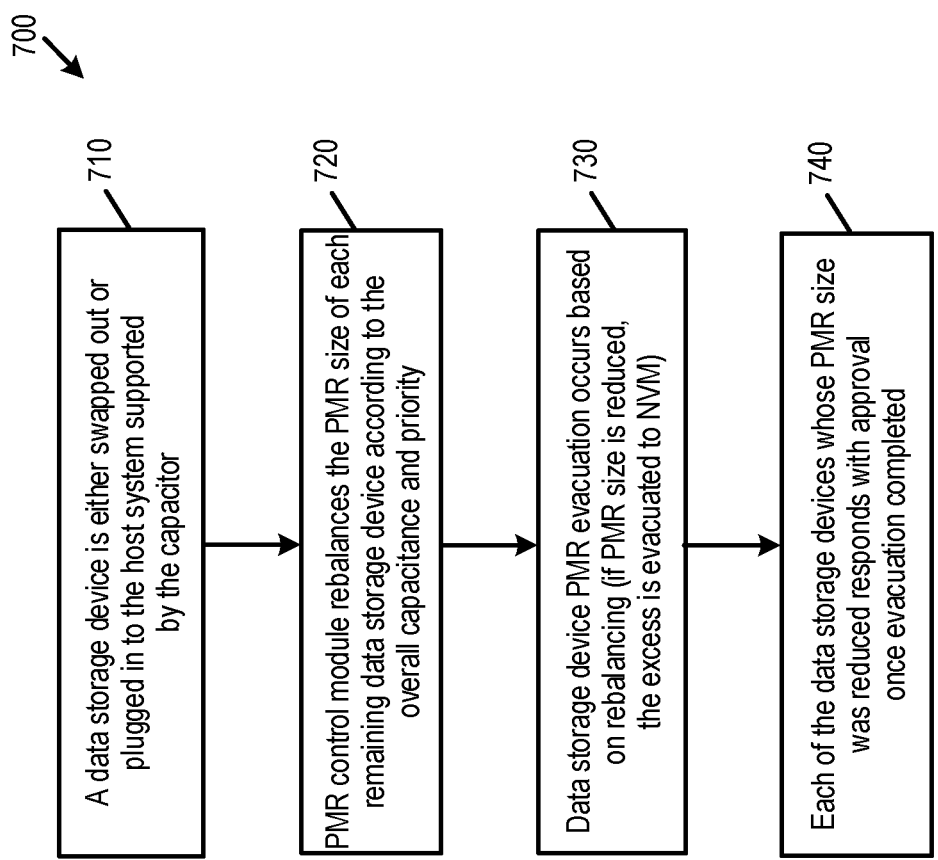
FIG. 7 is a flow chart of a rebalancing method of an embodiment that follows a hot-swap of a storage device.

In another embodiment, a data storage device can be hot-swapped (or hot-plugged) into the host. In this situation, a rebalancing process can be initiated across all the remaining data storage devices, so that the PMRs overall power budget is distributed correctly. This is illustrated in the flow chart 700 in FIG. 7. As shown in FIG. 7, a data storage device is either swapped out or plugged into a host system that is supported by a shared capacitor (act 710). Then, the PMR control module 500 in the host 300 rebalances the PMR size of each remaining data storage device according to the overall capacitance and priority (act 720). Next, the data storage device PMR evacuation occurs based on rebalancing (act 730). For example, if the PMR size is reduced, the "excess" data is evacuated to non-volatile memory in the data storage device. Then, each of the data storage devices whose PMR size was reduces responds with approval once evacuation is completed (act 740).

Figure 8:
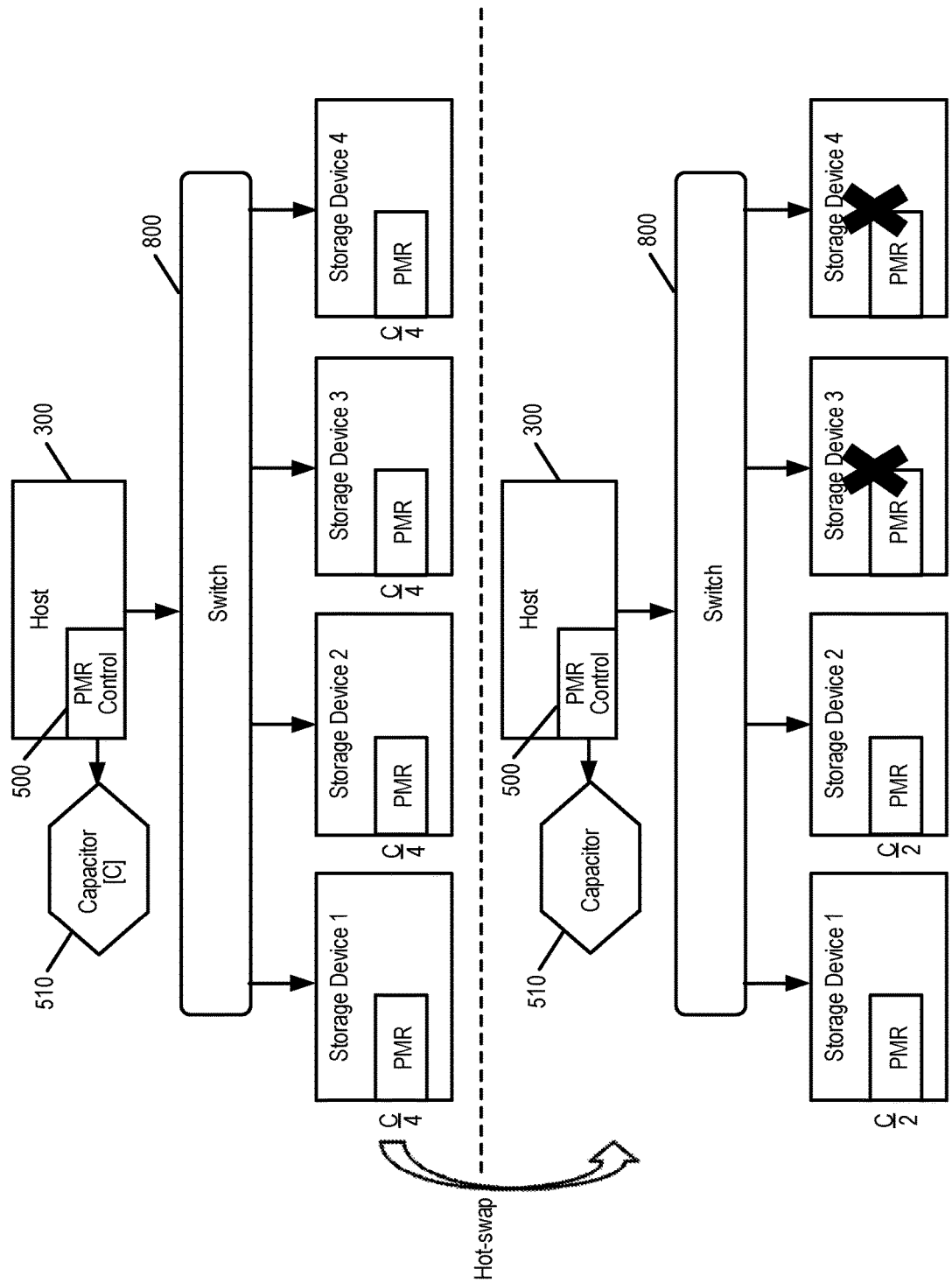
FIG. 8 is a block diagram of a system of an embodiment that illustrates a hot-swap of a storage device.

FIG. 8 is a block diagram of a system that supports multiple PMRs with a shared capacitor. As shown in FIG. 8, a switch 800 is used to communicatively couple the host 300 with the plurality of data storage devices. In the top part of FIG. 8, the PMR control module 500 initially configures the power distribution such that each of the data storage devices receives one-fourth of the power supplied by the common capacitor 510. In the bottom part of FIG. 8, a hot-swap occurs, after which the only two data storage devices are alive in the system. The PMR control module 500 accounts for this by reconfiguring the power distribution such that the two remaining data storage devices each get one-half of the power supplied by the common capacitor 510. In another embodiment, the rebalancing procedure may occur following a modification of the capacitance itself, which may either be reduced or increased (in case more power is available to the current host).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method comprising:
   performing in a host in communication with a plurality of data storage devices, each data storage device of the plurality of data storage devices having a persistent memory region and a non-volatile memory, wherein the host comprises a capacitor shared by the plurality of data storage devices:
   determining an allocation of power from the capacitor to each data storage device of the plurality of data storage devices, wherein power allocated to a given data storage device enables that data storage device to copy data from its persistent memory region to its non-volatile memory in an event of a power failure; and
   dynamically changing the allocation of power from the capacitor to at least one data storage device of the plurality of data storage devices.

2. The method of claim 1, wherein the allocation of power is dynamically changed in response to a requirement from the at least one data storage device.

3. The method of claim 1, wherein the allocation of power is dynamically changed in response to a period of time elapsing.

4. The method of claim 1, wherein the allocation of power is dynamically changed in response to a change of priority among the plurality of data storage devices.

5. The method of claim 1, wherein the allocation of power is dynamically changed in response to a removal of a data storage device from the plurality of data storage devices.

6. The method of claim 1, wherein the allocation of power is dynamically changed in response to an addition of another data storage device to the plurality of data storage devices.

7. The method of claim 1, wherein the allocation of power is dynamically changed in response to a change in capacitance of the capacitor.

8. The method of claim 1, further comprising changing a transfer buffer size of the at least one data storage device based on the changing change in the allocation of power to the at least one data storage device.

9. The method of claim 1, further comprising changing a size of the persistent memory region of the at least one data storage device based on the changing the allocation of power to the at least one data storage device.

10. The method of claim 1, wherein the host is in communication with the plurality of data storage devices via a switch.

11. A data storage device comprising:
    a non-volatile memory;
    a volatile memory; and
    a processor configured to communicate with the non-volatile memory, the volatile memory, and a host, wherein the processor is further configured to:
    receive, from the host, a size allocated for a persistent memory region in the volatile memory that is backed by a host capacitor that is shared by at least one other data storage device;
    receive, from the host, a rebalanced size for the persistent memory region due to a change in supplied power from the host capacitor; and
    evacuate, from the persistent memory region to the non-volatile memory, data that can no longer be stored in the persistent memory region due to the rebalanced size.

12. The data storage device of claim 11, wherein the processor is further configured to inform the host after the data has been evacuated from the persistent memory region to the non-volatile memory.

13. The data storage device of claim 11, wherein the processor is further configured to change a transfer buffer size in response to the rebalanced size.

14. The data storage device of claim 11, wherein the processor is further configured to write contents of the persistent memory region to the non-volatile memory in response to an emergency power fail.

15. The data storage device of claim 14, wherein the processor is further configured to return the contents to the persistent memory region in response to a return of power.

16. The data storage device of claim 11, wherein the host is configured to read from or write to the persistent memory region directly without using a command queue in the data storage device.

17. The data storage device of claim 11, wherein the processor is further configured to cache, in the persistent memory region, at least a portion of a logical-to-physical address table.

18. The data storage device of claim 11, wherein the non-volatile memory comprises a three-dimensional memory.

19. A host comprising:
    a capacitor shared by a plurality of data storage devices, each data storage device of the plurality of data storage devices having a persistent memory region and a non-volatile memory; and
    means for:
    determining an allocation of power from the capacitor to each data storage device of the plurality of data storage devices, wherein power allocated to a given data storage device enables that data storage device to copy data from its persistent memory region to its non-volatile memory in an event of a power failure; and
    dynamically changing the allocation of power from the capacitor to at least one data storage device of the plurality of data storage devices.

* * * * *